(12) United States Patent
Hardt

(10) Patent No.: US 8,635,679 B2
(45) Date of Patent: Jan. 21, 2014

(54) NETWORKED IDENTITY FRAMEWORK

(75) Inventor: Dick Clarence Hardt, Vancouver (CA)

(73) Assignee: Webler Solutions, LLC, Dover, DE (US)

( * ) Notice: Subject to any disclaimer, the term of this patent is extended or adjusted under 35 U.S.C. 154(b) by 1519 days.

(21) Appl. No.: 11/608,432

(22) Filed: Dec. 8, 2006

(65) Prior Publication Data

US 2007/0143860 A1 Jun. 21, 2007

Related U.S. Application Data

(60) Provisional application No. 60/749,343, filed on Dec. 8, 2005.

(51) Int. Cl.
*H04L 29/06* (2006.01)

(52) U.S. Cl.
USPC ....... 726/6; 726/4; 726/28; 713/155; 713/168

(58) Field of Classification Search
USPC ............................................ 726/28; 713/155
See application file for complete search history.

(56) References Cited

U.S. PATENT DOCUMENTS

| | | | | |
|---|---|---|---|---|
| 6,185,316 | B1 * | 2/2001 | Buffam | 382/115 |
| 6,668,322 | B1 | 12/2003 | Wood et al. | |
| 2002/0032634 | A1 * | 3/2002 | Abrams et al. | 705/37 |
| 2002/0133535 | A1 * | 9/2002 | Lucovsky et al. | 709/201 |
| 2002/0174363 | A1 * | 11/2002 | Chefalas et al. | 713/201 |
| 2003/0061092 | A1 * | 3/2003 | Dutta et al. | 705/12 |
| 2003/0229783 | A1 * | 12/2003 | Hardt | 713/155 |
| 2004/0186813 | A1 * | 9/2004 | Tedesco et al. | 706/14 |
| 2005/0010547 | A1 | 1/2005 | Carinci et al. | |
| 2005/0198322 | A1 * | 9/2005 | Takabayashi et al. | 709/228 |
| 2005/0283443 | A1 | 12/2005 | Hardt | |
| 2005/0283614 | A1 | 12/2005 | Hardt | |
| 2006/0005020 | A1 | 1/2006 | Hardt | |
| 2006/0005263 | A1 | 1/2006 | Hardt | |
| 2006/0034494 | A1 * | 2/2006 | Holloran | 382/116 |
| 2006/0235973 | A1 | 10/2006 | McBride et al. | |
| 2007/0002360 | A1 * | 1/2007 | Levien et al. | 358/1.14 |
| 2007/0083460 | A1 * | 4/2007 | Bachenheimer | 705/38 |

FOREIGN PATENT DOCUMENTS

CA 2568096 7/2008

OTHER PUBLICATIONS

International Search Report; Application No. PCT/CA2006/001991, dated Apr. 27, 2007.

* cited by examiner

*Primary Examiner* — Morshed Mehedi
*Assistant Examiner* — Jason Lee
(74) *Attorney, Agent, or Firm* — Knobbe Martens Olson & Bear LLP

(57) ABSTRACT

A system and method provide a framework for networked identity management in a user-centric model by providing the ability for a user to delegate permissions to release identity information, by enabling a mechanism for releasing one of a requested plurality of data sets and by providing facilities for the retrieval of identity information from an external server. Anonymization of identity data is enabled through the use of an anonymizer system that can optionally be integrated with an identity store such as a homesite.

37 Claims, 10 Drawing Sheets

NETWORKED IDENTITY FRAMEWORK

CROSS REFERENCE TO RELATED APPLICATIONS

This application claims the benefit of U.S. Provisional Application No. 60/749,343 filed Dec. 8, 2005, which is incorporated herein by reference.

FIELD OF THE INVENTION

The present invention relates generally to identity management. More particularly, the present invention relates to a framework for electronic identity management within a distributed hierarchical identity management network.

BACKGROUND OF THE INVENTION

Identity cannot be left out of many modern transactions. Whether someone wants to purchase items on the Internet, buy a house, or otherwise engage in commerce, providing identification is often part of the transaction. This may involve providing billing information, providing overall financial information, or simply proving eligibility to engage in a transaction.

On the Internet, identity is often held in silos. For example, a user may have identity information provided to a website such as eBay, and similar identity information provided to a website such as yahoo. However, exchanging identity information between yahoo and eBay may be impossible. For example, an eBay reputation rating may not be exportable for use in chat rooms available through yahoo, even though the user is the same. As a result, a user may be required to provide identifying information over and over again.

Some systems have attempted to avoid this problem. For example, digital wallets have been provided, which potentially could store passwords. Additionally, centralized systems have been implemented, in which a single administrative system provided access to a network of websites through a portal (and charged fees to do it). However, it may be useful to allow the user to log in somewhere, and then have the user's chosen site validate or authenticate the user's identity with other sites.

Identity Management systems are known to those skilled in the art, including those described in Canadian Patent 2,431, 311, 2,468,351, 2,468,585, 2,493,897 and 2,494,225, and their corresponding U.S. and international counterparts, which are all incorporated herein in their entirety by reference.

It is, therefore, desirable to provide a framework for carrying out enhanced identity management functions in distributed and/or hierarchical identity management networks.

SUMMARY OF THE INVENTION

One object of the present invention to obviate or mitigate at least one disadvantage of previous identity management systems.

In a first aspect of the present invention there is provided a method or releasing a set of identity information data from a homesite to a membersite in an identity management network. The method includes the steps of receiving a request for one of a plurality of sets of identity data associated with a user from a membersite; selecting one of the requested sets of identity data from the plurality of sets in accordance with a user preference; and transmitting the selected set of identity data to the membersite. Additionally included in the first aspect of the present invention is homesite for releasing a set of identity information data to a membersite in an identity management network. The homesite includes a request interface for receiving a request for a plurality of identity data sets, a data set selector, such as a complex query engine, for selecting one of the data sets, and a transmitting interface for transmitting the selected set to the membersite. One skilled in the art will appreciate that the system of the first aspect of the invention can carry out the method of the first aspect of the invention, and all its embodiments.

In an embodiment of the first aspect of the present invention, the step of receiving the request includes receiving a request from the membersite via the user, the step of selecting one of the requested sets includes selecting a set either in accordance with a predetermined user preference or by obtaining a user selection of one of the presented sets, and the step of transmitting includes transmitting the selected set to the membersite via the user. In another embodiment, the received request includes an ordered list of the plurality of sets. The ordered list can be an indication of a hard priority or a soft priority from the membersite. The indication of soft priority can include an indication of an association between each of the plurality of requested sets and a plurality of levels of access. The set of identity data can include an identity claim, which can have an expiry date. Where the identity data includes an identity claim, the step of transmitting can include determining if the identity claim has expired, and optionally updating an expired claim and transmitting the selected set upon receipt of an updated identity claim. The identity claim can include attributes of the user or of the homesite. Where the identity claim includes attributes of the homesite, the attribute can be a certification of an authentication at the homesite, the authentication can be provided by a third party and may include a hash of an authentication engine at the homesite used to authenticate the user identity.

In a second aspect of the present invention, there is provided a method of submitting user data to membersite from a homesite. The method comprises the steps of receiving a request for user identity information from a membersite; determining that the active user has received proxy rights to the requested user identity information; and transmitting the requested user identity information to the membersite. Those skilled in the art will appreciate that the second aspect of the invention additionally includes a homesite for providing user information to a membersite. The homesite includes a request interface for receiving identity requests, a proxy engine, such as a delegation permissions interface, for determining that an active user has been delegated access to user identity information, and a transmitting interface for transmitting the requested user identity information upon receipt of an indication from the proxy engine that the active user has been delegated access, transmitting the requested data to the membersite. One skilled in the art will appreciate that the system of the second aspect of the invention can carry out the method of the second aspect of the invention, and all its embodiments In a first embodiment of the second aspect of the present invention, the step of determining includes determining that the active user is listed on a proxy list associated with the user associated with the requested user identity information. In another embodiment, the step of determining includes determining that the active user has an identity claim providing authorization for the requested user information. In a further embodiment, the step of determining includes requiring the active user to authenticate. In a further embodiment, the request for user identity information is received as a uniform resource locator, which may point to a static request document, or to a dynamic request document generated by the requesting node in accordance with at least one of the user network address and a requested service.

In a third aspect of the present invention, there is provided a method of anonymizing identity information associated with a user being transmitted from a homesite to a membersite. The method comprises receiving identity information associated with the user from the homesite; redacting the identity information to remove identifying information associated with the user; and transmitting the redacted identity information to the membersite.

One skilled in the art will appreciate that the third aspect of the present invention further includes a system for anonymizing user identity information including a receiving interface for receiving user data, a redacting engine for redacting user identity information from the received user data, and a transmitting interface for transmitting the redacted user data. One skilled in the art will appreciate that the system of the third aspect of the invention can carry out the method of the third aspect of the invention, and all its embodiments In a first embodiment of the third aspect of the present invention, the identity information includes information selected from a list including: a unique identifier associated with the user; a user birth date; and a user address. Where the identifying information is a unique identifier, the step of redacting can include replacing the unique identifier with an identifier that is pairwise unique between the user and the membersite. Where the identifying information is a unique identifier, the step of redacting can include replacing the unique identifier with an identifier selected from a pool of identifiers. Where the identifying information is a user birth date, the step of redacting can include replacing the user birth date with an age range. Where the identifying information is a user address, the step of redacting can include replacing the user address with one of a country, province, state, city, postal code, zip code or other non-specific geographical indicator derived in accordance with the user address.

In a fourth aspect of the present invention there is provided a method of providing user identity information to a membersite. The method comprises receiving a request for a set of user identity information from the membersite; issuing a request for an element in the requested set to an external site; receiving the requested element from the external site; and transmitting the received requested element from the external site to the membersite in response to the received request.

One skilled in the art will appreciate that the fourth aspect also includes a homesite for obtaining user information from an external server in response to a request for user identity information, the homesite comprising an external server interface for issuing requests to an external server for user identity information and for receiving user identity information from the external server in response to issued requests, a membersite interface for receiving requests for user identity information from a membersite and for transmitting responses to the received request to the membersite, and a request analyzer for determining that data requested by the membersite is obtained from the external server. One skilled in the art will appreciate that the system of the fourth aspect of the invention can carry out the method of the fourth aspect of the invention, and all its embodiments In a first embodiment of the fourth aspect of the present invention, the step of receiving a request includes receiving the request from a membersite via the user. In another embodiment, the step of issuing a request includes redirecting the user to the external site with a request for the element. The step of receiving the requested element can include receiving the requested element from the external site via the user. The step of transmitting the received requested element includes transmitting the received requested information can include transmitting the received requested element via the user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
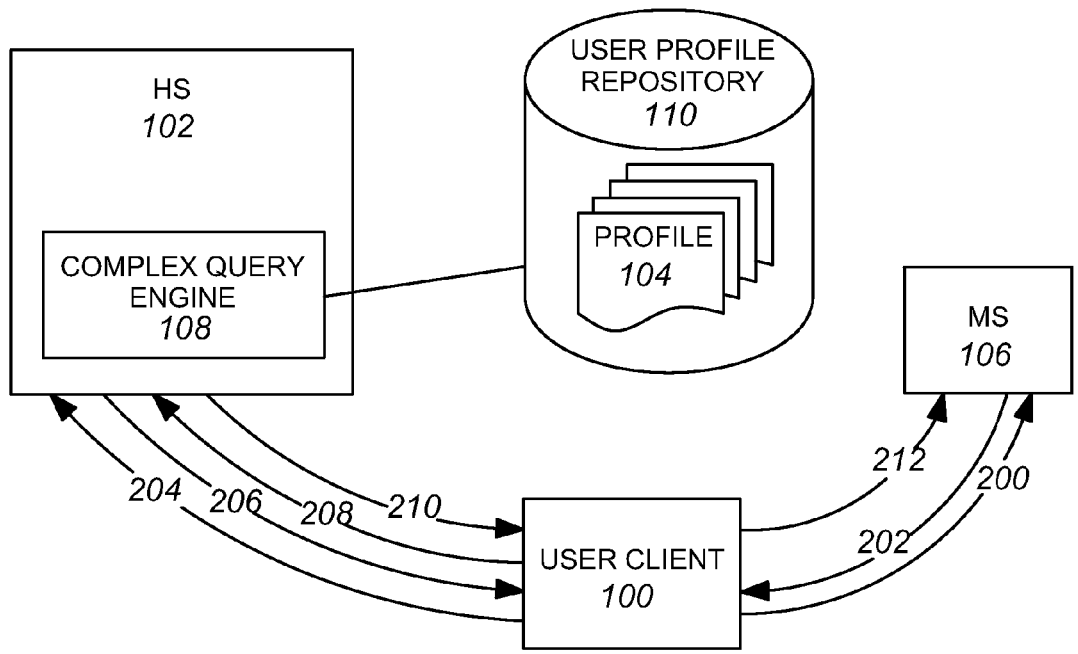
FIG. 1 is a block diagram illustrating data flows in a system of the present invention.

Generally, the present invention provides a method and system for networked identity management functionality.

A system, method and apparatus are provided for a networked identity framework. The specific embodiments described in this document are intended to represent exemplary instances of the present invention, and are illustrative in nature rather than restrictive. Other embodiments may ultimately prove preferable, without departing from the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Generally, the method and system for allowing requests for alternate data sets, updating dependent identity claims and providing proof of authentication is described and illustrated. Although the descriptions provided below are presented in view of a distributed hierarchical identification management system, they can be implemented in any number of other systems, including federated identity management systems and purely hierarchical identity management systems.

An identity claim is an assertion that an identity has a particular attribute value. In some embodiments, the identity claim is a digitally signed n-tuple of a globally unique persona identifier (GUPI) and an attribute value. In many identity management systems, an entity requesting information, hereinafter referred to as a membersite, will request identity claims associated with a user or information about the user. If the information or claims cannot be provided, the membersite will make another request for a subsequent set of data or a different identity claim. Thus, the membersite can request varying sets of information, in a defined order. In the alternate, the membersite can request the union of each of these sets of data, and then parse the resulting response to determine if sufficient information has been received. There is a decided disadvantage to this functionally adequate request methodology, in that the user is often prompted to approve of the release of the information. The user would then either be requested to release multiple sets of data or release a very large set of data. Many users often regard this as intrusive or suspicious behavior.

In an embodiment of the present invention, a complex query structure is supported to allow a single request for one of a number of data sets of identity information. The request is presented as a complex query to an identity store, hereinafter referred to as a homesite, which is typically implemented as a local application or as a webservice and is responsible for authenticating a user. This query can contain a set of requests, each request specifying a different set of identity data that is required. The homesite can then analyze the requests to determine which requests can be replied to based on the available data. The set of data that is provided in response to the complex query can be selected by the user, in conjunction with information provided by the membersite. This is analogous to real world solutions that allow for different types of credentials.

Consider the following situation: To enter a given country documentation must be provided. Depending on the country that the visitor is from, different documentation may be required. The default for a visitor would be the requirement to produce a valid passport and a visa. If the visitor is from a select set of countries, the visa requirement is waived, and the visitor is only required to provide a passport indicating citizenship in a country in the selected set. Further, if the visitor is from a specific country, proof of citizenship and photographic ID are required. Thus, the requirement for admission is "(passport and visa) OR (passport and proof of citizenship from country in the selected set) OR (photo ID and proof of citizenship from the specific country)". It should be noted that a credential such as a passport could serve as a number of the requirements, such as serving as both a photo ID and proof of citizenship. An analogous digital instance of such a situation and condition allows a membersite to request multiple data sets from the user, and allow the user or the homesite storing the user data to select the set that will be provided. The request can be provided in a ranked or unranked form. Upon receipt of the request, the homesite may prompt the user to approve release of the information. This can be done so that the user can select which set of identity data should be released.

It should be noted that the membersite can include a priority for receiving the requested data in the complex query. Thus, a ranked set can be considered to be a hard priority in which a preferred set of data is provided if available, and lower priority items are only acceptable if no higher priority sets are available. The membersite could also provide a soft priority ranking that indicates a strong preference, but does not require that a certain data set is provided in response. The membersite can additionally provide an indication that the level of functionality or access will be determined in accordance with the data set provided.

In various embodiments, different systems may be implemented. In one such system, a user may maintain an identity profile consisting of the set of identity data that a user stores at a Homesite. The identity profile can contain multiple personas, each with its own subset of context-specific identity data associated with the user. Thus, each persona is a set of identity data associated with a GUPI. A user can have multiple personas as part of their identity profile. For example, a user might have a work persona and a home persona. To assign GUPIs, a rootsite may be employed. Also known as the root, a rootsite is a registry that manages Homesite, Membersite, and Authoritative Site membership in the identity network and manages a GUPI namespace for its registered homesites. An authoritative site is a site capable of issuing identity claims or credentials associated with a user.

In embodiments of the present invention where the GUPI is a URL, the URL can be used to specify which homesites are authoritative for the user. This can be done by providing a list of the authoritative homesites in the document referenced by the URL. When a membersite receives a response from the homesite, the GUPI can be checked to determine that the homesite signing the response is authoritative for the GUPI.

To implement many embodiments of such systems, user clients are employed. In the distributed hierarchical identity management network, identity transactions are preferably sent through the user's client, to provide a user-centric implementation of identity management. The use centric implementation will be used in the following illustrative examples but should not be considered as essential or limiting to the scope of the present invention. A "client" can be one or more of the following (among other examples): a web standard browser; a smart web browser (a browser offering a more streamlined user experience by providing an interface for the user to specify his homesite, otherwise viewed as an identity network aware browser); a personal homesite (a simplified version of a Homesite executed locally by the user, enabling local storage of identity data, permitting all homesite to client communication to be performed on the user's local system. The personal homesite may be integrated directly into the browser in some embodiments.); a rich client (an application customized to interact with one or more Web Services); and a smart client (a client with internal functionality related to the protocols used for exchanging identity information, allowing for more streamlined operations.)

FIG. 1 illustrates an embodiment of a method and system of the present invention illustrating data flow between a user client 100 (belonging to a user with identity data stored as profile 104 in a database such as user profile repository (UPR) 110 at homesite (HS) 102 and membersite (MS) 106 and HS 102. MS 106, in this embodiment, offers a service and requires identity information from the user for registration.

After User Client 100 connects to MS 106 over data path 200, MS 106 sends a request containing a complex data query that along with a redirection instruction is sent to user client 100 over datapath 202. The redirection instruction redirects user client 100 to HS 102 and sends the request for information over data path 204. The HS 102 can then authenticate the user if required, and presents User Client 100 with either the different sets of requested data or the MS preferred data over data path 206. This data is extracted from profile 104 by complex query engine (CQE) 108. One skilled in the art will appreciate that queries handled by CQE 108 can be simple requests for a single set of data or more complex queries as described herein. After receiving the selection of the set of data to release and consent to release the data from user client 100 over data path 208, HS 102 then sends the set of selected data to user client 100 along with a redirection instruction over datapath 210. User client 100 is redirected to connect with MS 106 over data path 212 and submits the 10 data provided by HS 102 as a response to the identity request.

Data is stored in a variety of forms either in the homesite, or in a data repository accessible to the homesite. Identity claims that satisfy queries are stored either at the homesite or in the aforementioned repositories, and are preferably tested to determine if they match the query. This testing can occur at the homesite, and preferably includes the determination of whether the claim is still valid or if it has expired. Testing of a claim may involve testing dependent claims, which is necessary for validation of higher-level claims. The dependency of one claim on another need not be revealed to the membersite, but instead, it is left to the homesite to validate the claims provided to the membersite. Identity data and claims can be stored in the form of flat file profiles, relational databases, hierarchical data structures, or other forms.

Upon receipt of a complex query request for info, the HS 102 determine which of the data sets requested in the complex query can be provided. This selection of data sets can then be presented to the user, through user client 100. The user can then provide an indication of which of the data sets should be submitted to MS 106. In another embodiment, MS 106 can specify in the complex query request a hard or a soft priority associated with the requests. A soft priority would be used to determine how the requested data is displayed to the user, putting the most preferred data at the top of the list. The soft priority may also provide the user with commentary supplied by MS 106 indicating that different levels of access to the services provided by MS 106 will be provided for each of the available data sets. This allows MS 106 to provided tiered access depending on the information provided by the user client 100. A hard priority can be used to specify that a certain data set is required, and only if it is not available can the next item on the list be used. In yet another embodiment, the HS 102 can automatically choose the least intrusive option for satisfying the query, potentially in response to priorities set or approved by a user.

Many of the complex query requests issued by MS 106 will include requests for identity claims. Those claims are typically certified by a third party and are held by the homesite to be released along with a verification statement so that a membersite can see that the third party has validated the identity claim. The verification statement may take the form of a digital signature associated with the authoritative site being applied to the identity claim. Typically identity claims are intended to expire, although this may not always be the case. Mechanisms to allow a homesite to refresh claims are already known, and commonly require a URI or URL to be provided to the homesite to permit the homesite and the authoritative site (AS) that issued the identity claim to communicate directly to refresh claims. However, many identity claims depend upon other claims, and thus can expire prior to their indicated expiry date if the claim from which they depend has expired. Thus, prior to providing an identity claim, a homesite will preferably validate the claim and all the identity claims from which it depends.

Note that the description within this document relates to datapaths between modules or entities. Such datapaths are not necessarily literal paths along which data travels. The datapaths may represent individual messages or packets sent or received, for example. Thus, multiple data paths between two modules indicates multiple messages or transactions.

Figure 2:
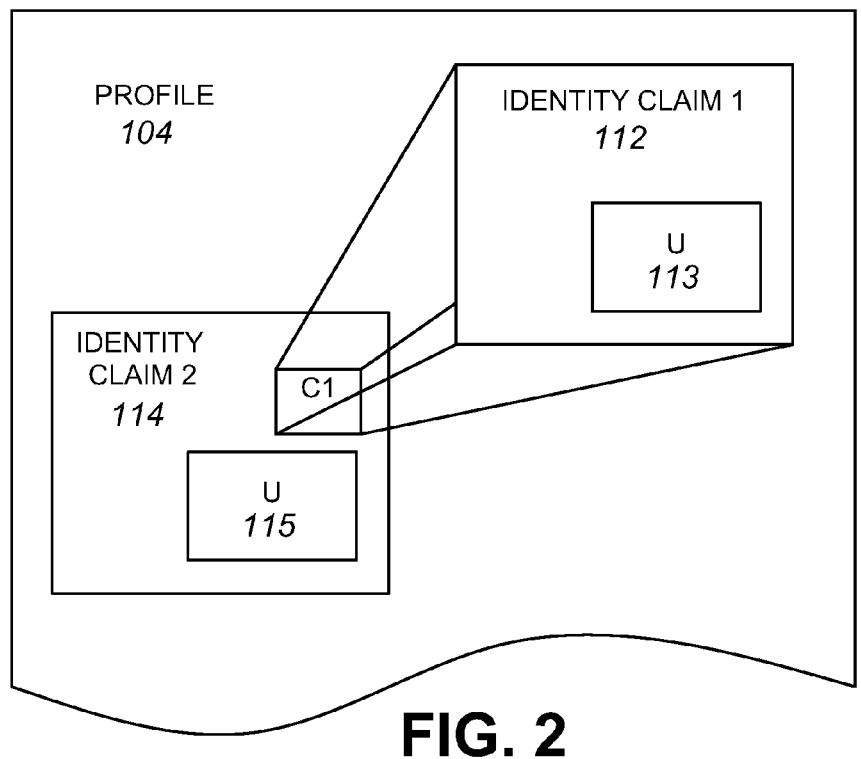
FIG. 2 is a block diagram illustrating logical nesting of identity claims in a user profile.

FIG. 2 illustrates the logical dependency of identity claims in a user's identity profile 104. A first identity claim (C1) 112 is stored in profile 104. In one example this claim could be proof of employment, and could include an employee number signed by the HR department of a corporation. A second claim (C2) 114 is also stored in profile 104. C2 114 depends upon C1 112, and in this example could assert that the user is a member of a project design team. This claim might be required by a gateway system used to allow design team members access to online resources. Prior to claim C2 114 being transmitted in response to a request, C1 112 must also be validated because if it has expired C2 1004 is invalid. Identity claims typically include an indication of how they can be validated, such as an update information field (U) that can specify a uniform resource locator (URL) or uniform resource indicator (URI). C2 114 includes update information field U 115, which allows HS 102 to update C2 114 if it has expired. As C1 112, or a link thereto, is embedded in C2 114, HS 102 can also obtain U 113 for C1 112 from C2 114.

Figure 3A:
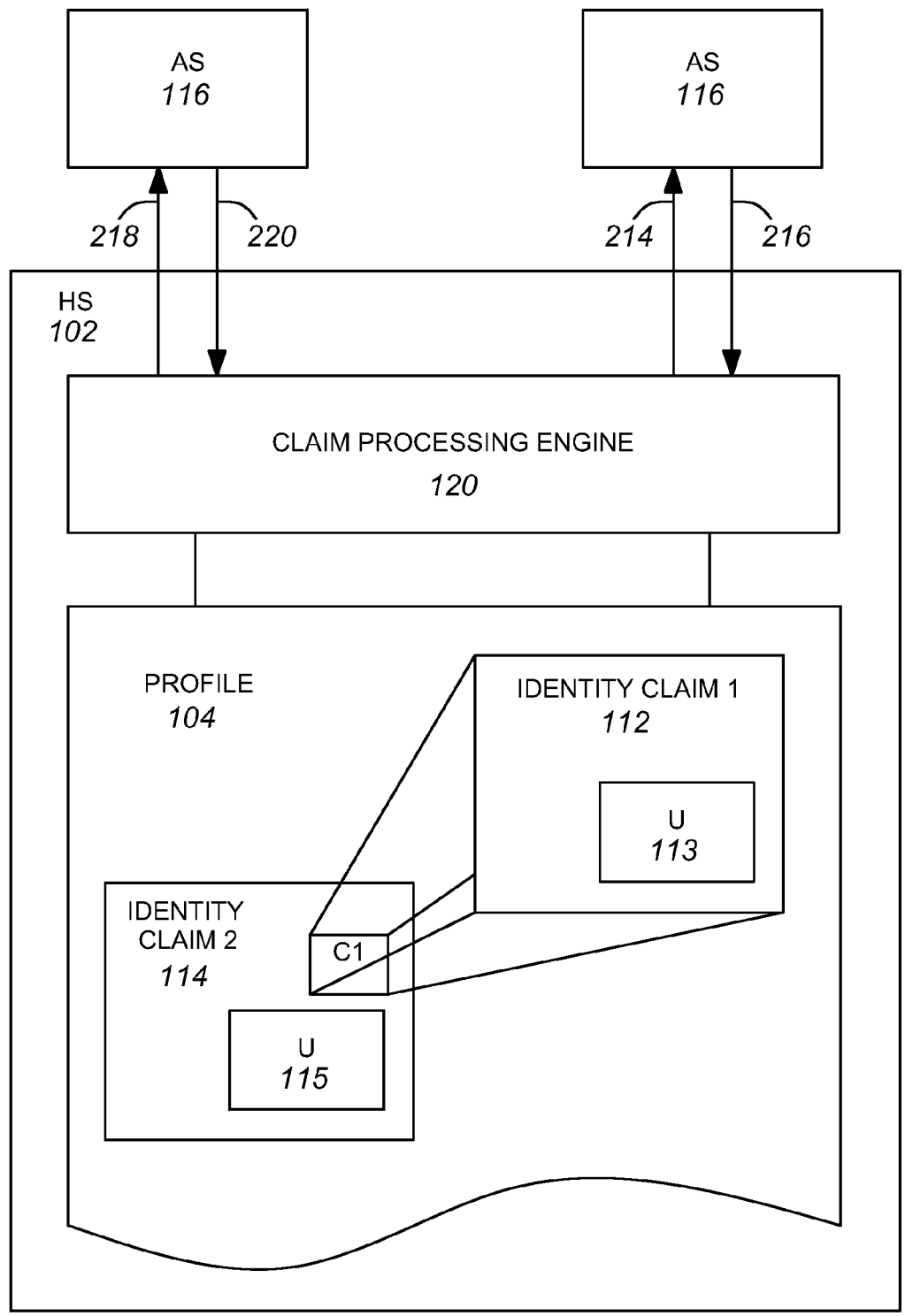
FIG. 3a is a block diagram illustrating exemplary data flows in the verification of identity claims.
Figure 3B:
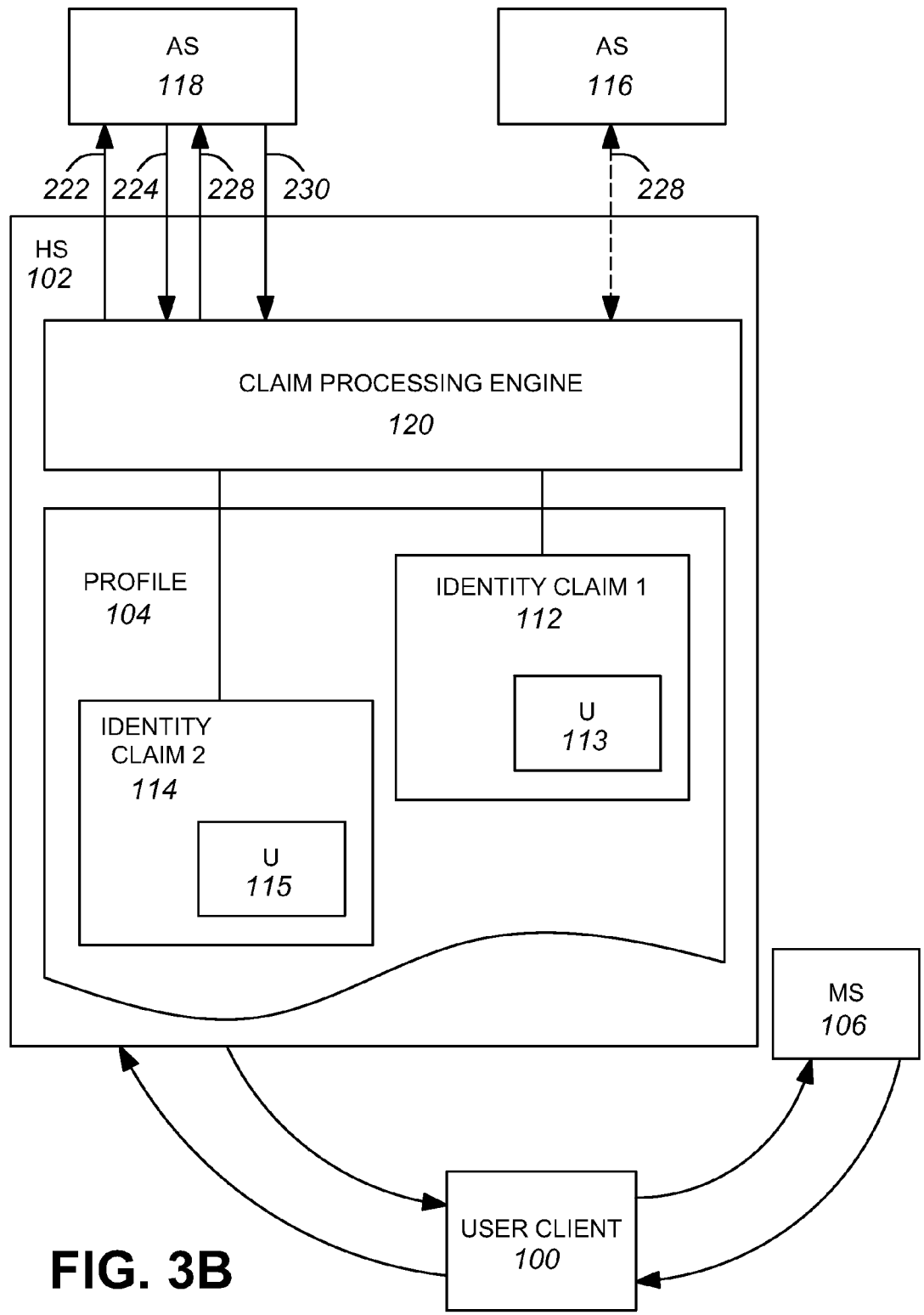
FIG. 3b is a block diagram illustrating exemplary data flows for transactions involving identity claims in a system of the present invention.

As indicated above, an otherwise valid claim may depend form an expired claim, in which case the expired claim must be refreshed during the claim validation process. FIG. 3a illustrates a data flow, whereby HS 102, using a CPE 120, examines C2 114. HS 102 determines that C1 112 must be valid for C2 114 to be updated, and that it can be updated using update information U 113 embedded in C1 112 and the link thereto in C2 114.

If the claim processing engine (CPE) 120 determines C2 114 has expired, it examines the claims required by C2 114. In this example C2 114 depends on C1 112. If C1 112 has expired, CPE 120 uses the U 113 associated with C1 112 to contact authoritative site AS 116, which issued the claim, over data path 214. C1 112 is updated by AS 116, and is given a new expiry date. The updated C1 112 is received over data path 216 by CPE 120 and is then stored in profile 104. CPE 120 then contacts AS 118 over data path 218 to update C2 114. U 115 embedded in C2 114 specifies both the URI of AS 118 and that C1 112 must be submitted. CPE 120 then submits C1 112 and obtains a refreshed C2 114, which is stored in profile 104.

As stated above, identity claims can depend on another claim, and can also be multiply dependant. An identity claim, from which another claim depends, may itself be dependent upon a third claim. To enable checking of multiple claims, and to enable checking chains of identity claims, CPE 120 can be implemented as a software agent that can follow the tree back or that can spawn multiple instances of itself to appropriately deal with branching caused by multiply dependent claims.

Dependent and multiply dependent claims can thus be updated without user intervention if desired by making use of CPE 120 to communicate with an authoritative site directly. In the previous example C2 114 could be a claim asserting that the user is a project team member. C2 114 depends on C1 112, which specifies that the user is an employee having a particular employee number.

When HS 102 receives a request from a site for C2 114, CPE 120 can examine the claim and determine that it is out of date. U 115 in C2 114 dictates what is required to update C2 114. In this example, U 115 indicates that C1 112 will have to be submitted. CPE 120 can then ensure that C1 112 is valid, update it if needed and then update C2 114 when all conditions for the refresh have been met. At this point C2 114 can be released to the membersite to allow the user to log in.

In another embodiment, CPE 120 can examine C2 114 and contact AS 118 over data path 222 to obtain the update for C2 114. AS2 118 issues a request over data path 224 to CPE 120 to provide C1 112. CPE 120 examines C1 112, determines whether it needs to be updated and if needed, contacts AS 116 over data path 226 to refresh C1 116. CPE 120 then sends C1 112 to AS 118, over data path 228. AS 118 then returns the renewed C2 114 over data path 230 to CPE 120. By updating claims only upon a request for the claim, CPE 120 of this embodiment obviates the need to link claims.

Claims are typically authenticated statements about an identity; however, it may be advantageous for the homesite to be able to provide a claim about itself. When HS 102 authenticates user 100 and provides MS 106 with confirmation of authentication and optionally with requested information including claims such as C1 112 and C2 114, it does so at the request of MS 106, and may use an authentication mechanism specified by MS 106. Specifying an authentication mechanism can be done in the request and can either specify a particular authentication technique or can specify a level of authentication in a prior defined hierarchy. If MS 106 knows the homesite, this is fine. For example, MS 106 can have a trust relationship with HS 102, and will presumably have one if HS 102 is the sole identity store. In a federated identity management system, MS 106 may have a trusted homesite or other such identity store, and would then be willing to trust any homesite that the trusted homesite has a trust relationship with. One problem is that, the homesite could be a rogue entity that has built trust and then decides to squander it. In a decentralized identity management system, with a plurality of unassociated homesites, MS 106 may not be willing to have sufficient trust in the user's selection of the homesite to trust that authentication, or any other statement, has been done to the standards required.

To address this issue, some embodiments provide a mechanism for a trusted third party (TTP) to make a claim about the authentication process to satisfy the demands of MS 106. HS 102 preferably has an identifier, herein after referred to as an HSID. A root entity can show that HS 102 is authoritative for a user's globally unique persona identifier (GUPI) by signing the HSID and the GUPI in the same data block. A third party, possibly the root entity in an identity management system, or a third party security vendor can assume a level of trust due to the reputation it has and the fact that it has nothing to gain from a fraud. This trusted entity can issue an authentication claim to HS 102, not to a particular user. This authentication claim could include the HSID and a statement that HS 102 has obtained its authentication engine as a sealed component that cannot be altered and that has met predefined security conditions. The claim can also include a value to be compared with another value provided by the HS 102. This data can then be digitally signed by the TTP.

MS 106 may not be able to establish a trust relationship with each homesite but it can establish a trust relationship with a limited number of TTPs. Thus, by providing the statement, HS 102 can provide MS 106 with trust that authentication of a user 100 was done to a desired level of security.

When TTP issues HS 102 an authentication claim asserting that its authentication engine is sufficient, it can include in the statement a hash of a portion of the authentication engine. HS 102 can be required to generate this hash as well, so that MS 106 can verify the signed value with the HS-generated value. This comparison will potentially indicate if HS 102 has had its authentication engine modified since the claim was issued. Sealed units of hardware housing code that cannot be modified by the end user may also be useful in this context. If HS 102 is one of these units, the HS claim can reflect that the unit is trusted because it (presumably) cannot be tampered with.

Figure 4:
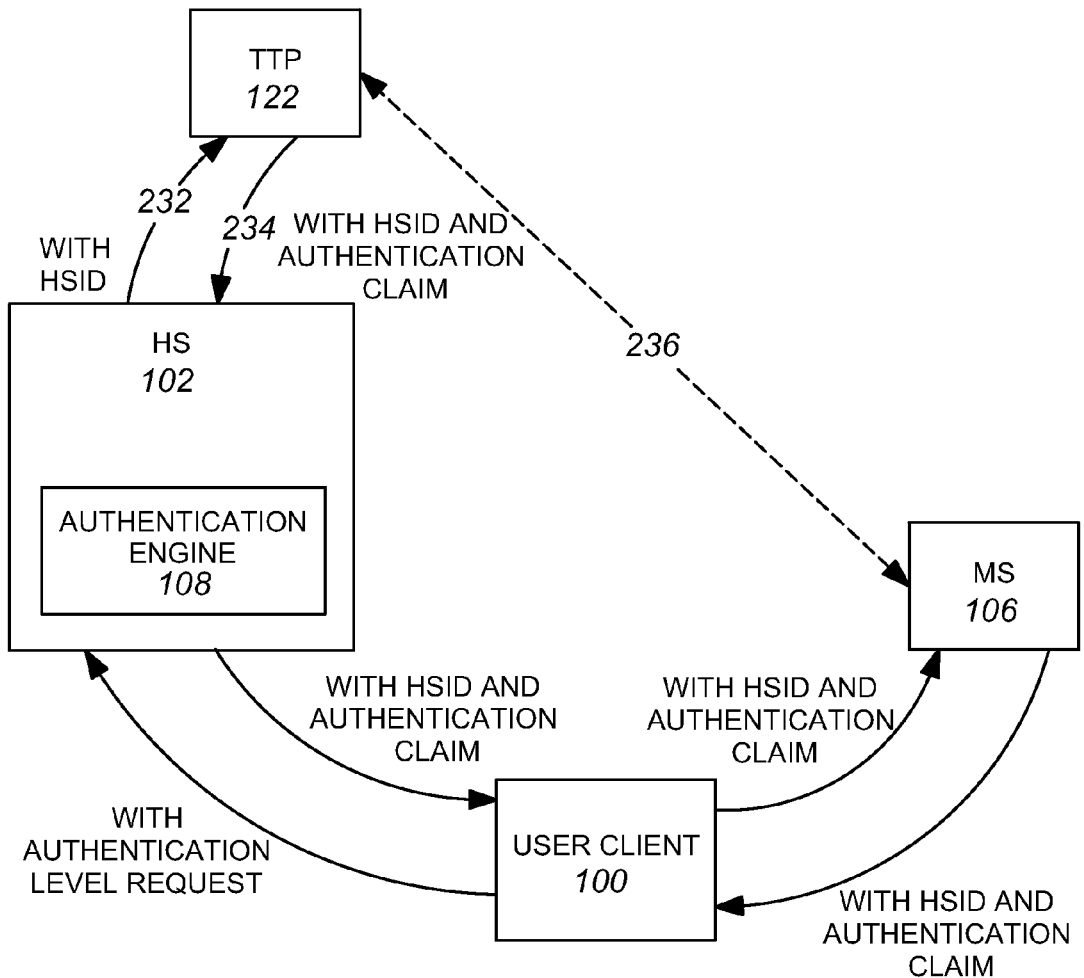
FIG. 4 is a block diagram illustrating an exemplary data flow for identity claims pertaining to a homesite being exchanged.

FIG. 4 illustrates a possible embodiment of the TTP examples described above. After receiving an authentication level request from MS 106, HS 102 performs the requested authentication and sends a request for an authentication claim to TTP 122 over data path 232. The request preferably contains a hash from the Authentication Engine confirming that the authentication was properly performed. It also contains an HSID confirming the identity of HS 102. After processing the request, TTP 122 sends a digitally signed authentication claim to HS 102 over data path 234. After receiving consent to release the requested data from User Client 100, HS 102 sends the authentication claim as part of the response to MS 106 via User Client 100.

As shown in the embodiment illustrated in FIG. 4, MS 106 can be set up to trust TTP 122, as shown by data path 236, which illustrates the trust relationship between MS 106 and TIP 122. A Membersite can state which trusted third party authentication vendors it trusts by including in its authentication level request acceptance of authentication claims signed by those trusted third-party authentication vendors.

In another embodiment, HS 102 includes a sealed unit, or a hardwired unit, for performing authentication. Instead of retrieving a claim from TTP 122 for multiple authentication transaction, HS 102 can retrieve a claim from TTP 122 confirming that the authentication software is accredited by the TTP, or a trusted authentication vendor association.

In another variation to the embodiment illustrated in FIG. 4, a user could have a trusted piece of vendor software on his or her machine that verifies that the requested authentication occurred. The software can have a key embedded in it confirming the authentication. This key can be sent to the membersite.

A similar type of software could also be used to confirm that a user's machine has all of the most recent security software installed, for example anti-virus applications and security patches. Similarly, claims about machine capabilities may be verified in a similar manner.

Along with trust on the membersite end, users may have trust relationship with other users. There are circumstances in which an individual user may want to delegate permission to another individual to act on their behalf in an identity transaction. The delegate is able to release identity data associated with one or more of the delegator's GUPIs to one or more sites (typically Membersites and Authoritative Sites), depending on the permissions specified by the delegator. These permissions can also be revoked at a later date. In some circumstances, delegation may be from one persona to another, allowing hiding of permanent personas or valuable personas, without requiring an anonymous process.

Delegation of the ability to release identity information allows someone to permit a trusted party to release an approved set of identity information to selected membersites for a particular purpose. This can be used to allow a co-worker to make travel arrangements on behalf of a user, among other such uses.

The permissions typically include the GUPIs that the delegate can release data for on behalf of the delegator, plus specific subsets of the data that can be released. For example, the delegator may only want the delegate to be able to release particular kinds of data. The permissions also typically include the sites that the delegate can release the data to and a revocation date, if applicable. How permissions are defined depends on the implementation of the invention. For example, they can be defined by a language or a table.

Figure 5A:
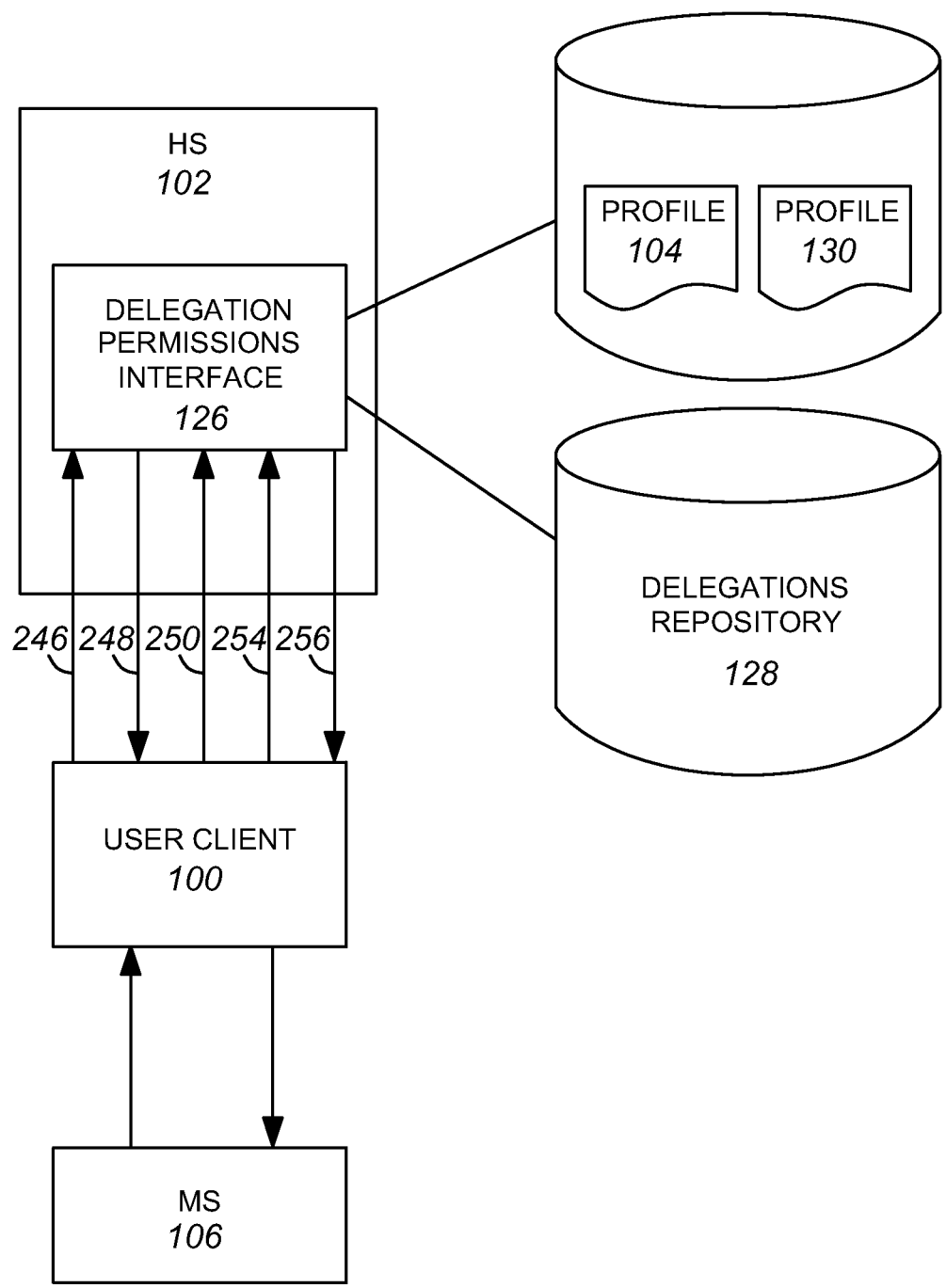
FIG. 5a is a block diagram illustrating an exemplary system of the present invention for delegating access to user identity information.
Figure 5B:
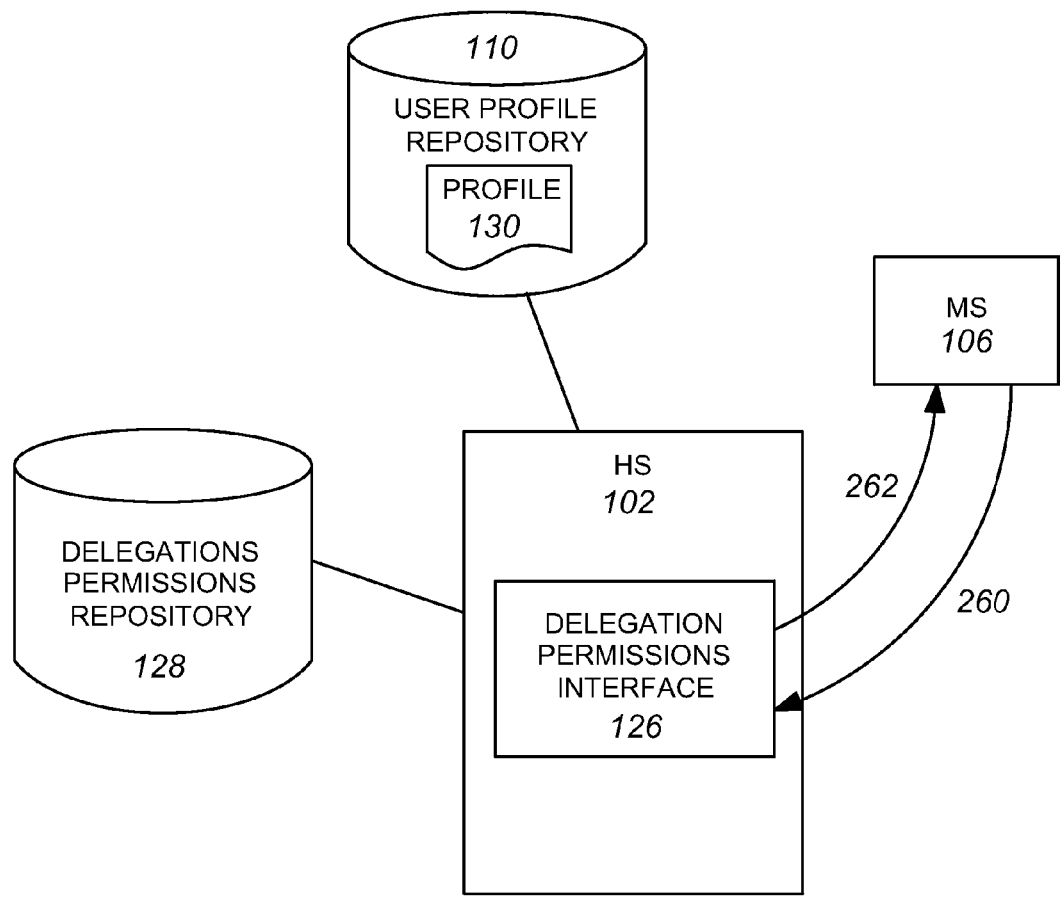
FIG. 5b is a block diagram illustrating exemplary data flows for a homesite acting as a delegate for a user in an embodiment of the present invention.

FIGS. 5a and 5b illustrate another embodiment. Homesite (HS) 102 receives a content request over data path 246 from User Client 100 whose identity data is stored in Profile 104 to delegate another user with permission to act on User 100's behalf to release data stored in Profile 104. In this embodiment, the delegate user already has identity data stored at HS 102, in Profile 130.

Delegation Processor (DP) 126 receives the user request to delegate authority to another user and presents user 100 with a user interface that can include options such as specifying one or more delegate users and the permissions to assign to each user over data path 248. DP 126 receives a response from User Client 100, over data path 250, containing the selected permissions and the user to delegate the permissions to, in this case the user whose data is stored in Profile 130. DP 126 processes the request, determines that the delegate user's profile at the Homesite is Profile 130. The requested permissions are stored in a Delegation Permissions Repository 128.

Data paths 252, 254, 256 and 258 are optional and are not made use of in the above-illustrated embodiment. In another embodiment, user client 100 represents the user whose data is stored in profile 130, and who has been delegated access to identity data in profile 104. In response to a content request from user 100, MS 106 transmits a request for user identity data to user 100 over datapath 252. This request includes a redirection instruction, and the request is passed from user 100 to HS 102 over datapath 254. During the processing of the request, HS 102 prompts the user to select the identity data to release and to provide consent to release that identity data to the MS 106. The identity data presented to User Client 132 includes the user's own identity data from Profile 130 and the identity data of the delegated user, in this case Profile 104. After processing the request HS 102 sends the released data over data paths 256 and 258, via User Client 132, to MS 106.

In another alternate embodiment, the Homesite can act as a Digital Assistant on behalf of the user, in this case user 100 has provided HS 102 with a delegation, such an embodiment is illustrated in FIG. 5b. The data flow for delegating the permission is similar to that shown in FIG. 5a, except that the delegator's identity data is not delegated to another user. The permissions are delegated to HS 102. HS 102 behaves as a User Client on behalf of the user. This may be synchronous, as in under the user's interactive control, or asynchronous, in the case of a user providing the Homesite with an action to perform at some predetermined time, or with a goal that the Homesite is to achieve.

As shown in FIG. 5b, in response to a content request from HS 102, MS 106 sends a request over data path 260 to HS 102. After receiving the request to release data from Profile 104, HS 102 confirms the permissions in DPR 128, releases the identity data and sends it over data path 262 to Membersite 106. HS 102 may employ a delegation permissions processor to handle requests involving delegation.

To permit a user to delegate authority to a user with another homesite, a user can instruct his homesite to generate an identity claim that can be issued to the second user. This identity claim permits the second user to access identity information stored by the first user's homesite. The second user can then go to a membersite, and indicate that she is authoritative for the release of information about the first member by submitting the identity claim. The identity claim is obtained from the second user's homesite, as any other identity claim would be. The claim can be made to expire, and it can be make revocable by requiring the second user's homesite to update the identity claim before every use of the claim.

In another embodiment, the second user can go to the membersite, and when prompted by her homesite to approve the release of a set of information, can instead select an alternate set of information based on the identity claim. The second user's homesite can then make a request to the first user's homesite by redirecting the second user to the first user's homesite with the identity claim. The first user's homesite then releases the first user's data to the second user's homesite, from where the user will be redirected to the membersite.

Delegation of the ability to release identity information can be restricted by the delegating user to permit only a specific subset of information to be released and/or that the delegated information can only be released to a certain selected set of membersites.

In a further embodiment, the first user can instruct a membersite that a second user is authoritative to act on their behalf. The first user can then deposit identity information with the membersite. When the second user visits the membersite, he can be prompted by the membersite to indicate which of the user information will be used. In either case, the membersite can require that the second user's homesite perform an authentication.

These mechanisms, and others that will be apparent to those skilled in the art can be used to perform delegations. It should be understood that the first user can limit the delegation by permitting the second user to a subset of the stored information, by permitting the second user to only submit the information to approved site, or by time-limiting the life of the delegation. Other mechanisms of restricting the delegation will be understood by those skilled in the art.

Homesites, whether acting on behalf of a delegate or a user, typically process claims. A Claims Query (CQ) defines the combination of claims required by a Membersite or Authoritative Site. Instead of sending the CQ as part of a request message, a Membersite can send a Query URL, which can be resolved to retrieve the CQ from the Membersite. One of the benefits of a Query URL message is potentially improved performance because in the case of a complex CQ less data is transferred in the request.

In many cases, identity queries are complex and lengthy. For a membersite, the same query may be generated a number of times. Instead of providing this query to each user and redirecting the user to the homesite, it may be beneficial for the membersite to provide a query URL that specifies the location of an identity query. In a user-centric identity management network, the user can provide the query URL to the homesite, and allow the homesite to retrieve the query. Without attempting to be exhaustive, the query URL can point to a static query hosted by the membersite, it may be a dynamically generated URL that points to a dynamically generated query hosted by the membersite, it could also be a static query hosted by a third party. If a query is referred to often enough using the same URL, it may be advantageous for the homesite to cache the query so that it does not need to retrieve it every time that it is submitted. To accommodate this scenario, it is preferable that whenever the Query is changed, the URL is also changed.

Where a homesite is acting as a delegate for the user, as discussed above, the homesite can initiate an interaction directly with the membersite, obtain the query URL, and then either retrieve the query from the specified location or from a cache. The request can be processed, and the appropriate response then provided to the membersite.

When user client 100 is a rich client, and is capable of processing identity queries, the rich client may use the Query URL as a key against which to cache the result of the query. In this case the membersite will preferably have a unique mapping between Query URLs and Claims Queries. When the rich client is interacting with a webservice provided through a membersite, it may receive a token URL from the webservice. The rich client can either retrieve the token from the specified URL and act on the token, or it can determine if the token has previously been retrieved and has been cached. If the token has been received and cached, the rich client can perform the required actions appropriate to receipt of the web service token.

Homesites permit the creation of personas by associating attributes to GUPIs. GUPIs are, in one embodiment, provided to the homesite by a network root or rootsite. The root administers a namespace of GUPIs associated with personas, and are bound to user information. GUPIs are assigned to users by either the rootsite, which then binds the GUPI to the homesite and in the process makes the homesite authoritative for the GUPI, or by the Homesite, which retrieves the GUPIs from the rootsite.

In some embodiments, the GUPI is a URL. The domain name in the URL preferably identifies the root that administers the namespace to which the GUPI belongs. The distributed hierarchical identity management network can consist of a number of GUPI namespaces. A homesite can host the identity information for a user from a number of different namespaces. It would also be possible for a single user to have multiple persona, each having a GUPI from a different namespace. Each part of a GUPI can be controlled by a different entity, allowing each entity involved to ensure that the GUPI is unique. Thus, the controller of a namespace may provide a monotonically increasing number as part of the GUPI, and another entity may make sure that each controller of a namespace has a different identifying portion of a GUPI to use as a starting point. Moreover, the GUPI may be authenticated, at least in part, through DNS (Domain Name Service), which is presently essential to the Internet itself.

Users in such a multi-namespace identity network can be identified by GUPIs with formats related to the different rootsites. Which homesites and membersites are then used can then depend on which rootsite is used—some rootsites may be affiliated with homesites, for example, whereas others may not be.

Figure 6:
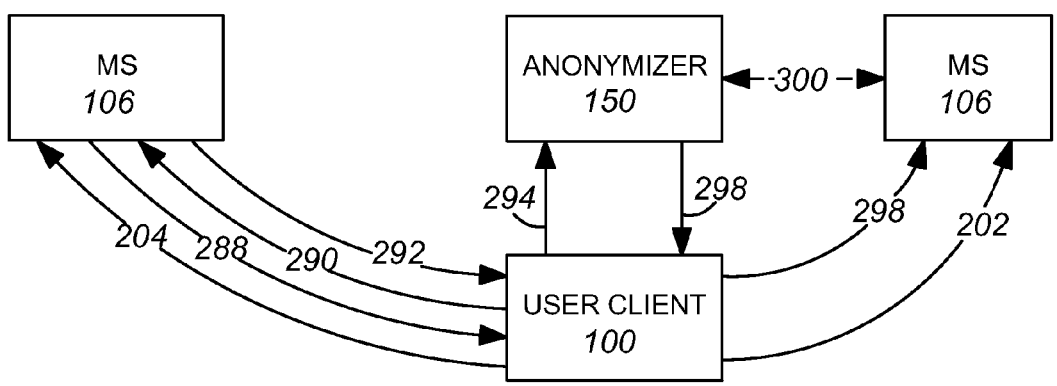
FIG. 6 illustrates an exemplary system and data flows for anonymizing identity transactions.

One purpose of an identity management network is to permit a user to provide identity information to membersites. It may be desirable for a user to be able to provide a membersite with information in such a way that the information cannot be easily traced back to the user. This relies upon an anonymization of the user information prior to submission to a membersite. FIG. 6 illustrates an embodiment of a system of the present invention designed to permit such communications.

In some scenarios, it may be required for a user to provide a credential, such as proof of age, but no other information. If a homesite provides this information, it will typically be bound to a GUPI that can be tracked by the membersite even if no other information is provided. It will be understood that there may be circumstances in which the user does not want the membersite to be aware that it is the same user carrying out multiple transactions.

To provide anonymous identity transactions where a user's activity cannot be tracked over time, a mechanism is required that allows authenticated identity information and identity claims to be issued that are associated with the identity transaction and not the GUPI. To provide this, an anonymizer can be used. FIG. 6 illustrates an anonymizer of the present invention. The anonymizer functionality can be provided as a service or by a vendor, it strips GUPIs and other identifying data from a set of claims and binds the set to the identity transaction. In this embodiment the attribute value is asserted to be associated with the nonce of the identity transaction and is signed using the certificate of the Anonymizer.

Anonymity may be understood as an aspect of privacy in which users are able to hide their identity when they access online resources. In the case of the distributed hierarchical identity management network, anonymity protects a user's identity by not allowing another entity outside of the Homesite to establish any link between the user's identity and their identifier (GUPI). An anonymizer may be implemented as Homesite(s) that can provide users with the option to anonymize their identity data, thus preventing their activity being tracked. When a user instructs the homesite to anonymize the identity data being released, the Homesite sends the released data to an Anonymizer that strips the user's identifier (the GUPI) from the released identity data. In one embodiment, pseudonymous GUPI's can be used, so that the user's GUPI is replaced with another GUPI. The GUPI can be pairwise unique between the user and the membersite (which means that it could be used by another user at another membersite), or it could be drawn from a pool of GUPIs and reused without any other such rules applied. In the first case, pseudonymity differs from anonymity in that the user is only partially able to conceal his or her identity. A Membersite can still track the user's activity over time at that Membersite, but the user's activities on other sites cannot be correlated to the same GUPI.

FIG. 6 illustrates an embodiment of a method of providing an anonymous transaction. In response to a content request from User Client 100, MS 106 sends a request for a set of one or more claims over data paths 202, 204 to HS 102. HS 102 prompts the user to select the claims to be returned to MS 106 and authenticates the user over data paths 288 and 290. The prompt includes an option to anonymize the identity transaction. HS 102 then sends User Client 100 the resultant claims, over data path 292. In an ordinary identity transaction datapath 292 would include a redirection instruction that forwarded the data to MS 106. Instead, in an anonymized identity transaction, the redirection forwards the user to anonymizer 150 over datapath 294. The anonymizer redacts the identity transaction by removing identifying information, such as the GUPI, and then binds the identity claims to the nonce used by the membersite to identify the transaction. The anonymized data is provided to the user client 100 over datapath 296, and is then forwarded to MS 106 over datapath 298.

In an identity response, the membersite is provided data that is signed by an entity. The notation used herein for this will be $[data]^{HS}$ to indicate that data being transferred and signed by the party in superscript, in this case the homesite. In a typically transaction, MS 106 provides a nonce along with the query, so that the user session can be maintained when the user returns. The data transmitted by HS 102 and received by anonymizer 150 is typically $[GUPI\ nonce]^{HS}\ [GUPI\ HS]^{root}$ $[GUPI\ AttributeValue]^{AS}$. This provides MS 106 with confirmation from the HS that the GUPI provided is associated with the nonce, confirmation from the root that the HS is authoritative for the GUPI, and confirmation from the authoritative site that an attribute is associated with the GUPI. The anonymizer 150 redacts this transaction to provide MS 106 with $[nonce\ AttributeValue]^{Anon}$.

For the anonymization process to function, MS 106 must have a trust relationship with anonymizer 150. MS 106 can provide a list of anonymizing agents to HS 102 in the initial request for identity data.

In an alternate embodiment, the anonymizer can be integrated with Homesite instead of a separate server. The data flow is similar to that shown in FIG. 6, with the exception that the anonymization request is processed at the Homesite and then sent to the Membersite via the user's client.

Identity data released to a Membersite is released under the stated privacy policy of the Membersite. This policy is often a static policy defined by the Membersite, and included in the request message as a URL to a policy document. This static policy can become a dynamic policy by supporting dynamic requests, in which the Membersite provides a form (for example in HTML or a subset of HTML) in the request that allows the user to negotiate the policy around which their identity data is released. The Homesite incorporates the request into the UI it presents to the user.

The form, in one embodiment, contains a list of options that the user can choose from, for example, permission for the Membersite to store the received identity data, the length of time that the Membersite can store the received identity data, the actions that the Membersite is allowed to perform with the identity data.

One skilled in the art will appreciate that during the exchange of policies, there may be a conflict between the policy provided by the membersite (which may have been provided on behalf of a webservice) and the acceptable policy stored by the homesite for the user. When a policy is received from a membersite, the homesite can access a personal policy and perform a comparison of the requirements of the two policies. This comparison is used to determine if a conflict exists. If no conflict exists, the requested data can be released according to user preferences. If there is a conflict, resolution of the conflict is undertaken. Variances can be presented to the user along with a request for consent to the variance. If the user consents, the conflicts are waived and the data is released. If the user does not consent, or does not fully consent, the homesite can present the (remaining) conflicts to the membersite and request a waiver of the conflicting terms. If the membersite waives the conflicting terms, the data can be released. If the waiver is not provided the process either fails, or the unwaived conditions are presented to the user, and the user is provided the final opportunity to waive the conditions or cause a failure of the conflict resolution process.

Note that policies may represent different constraints or permissions associated with data. Thus, a policy may be a privacy policy as is often used in Internet commerce. However, a policy may also be a constraint on what airlines (e.g. only Star Alliance airlines) may be flown by a traveler for booking purposes. Additionally, a policy may include conditions such as no dinner meetings or no breakfast meetings for purposes of scheduling meetings.

Some membersites may have a "my way or the highway" approach" of never waiving conflicts. Other membersites may accept conflicts (such as only flying Star Alliance airlines) as a necessary part of doing business.

This process not only allows for informed resolution of conflicts, but also allows for the results to be saved along the way, or at completion of the resolution process. This may create an auditable record of what was agreed to by each side, either for compliance purposes or for dispute resolution purposes, for example.

Figure 7:
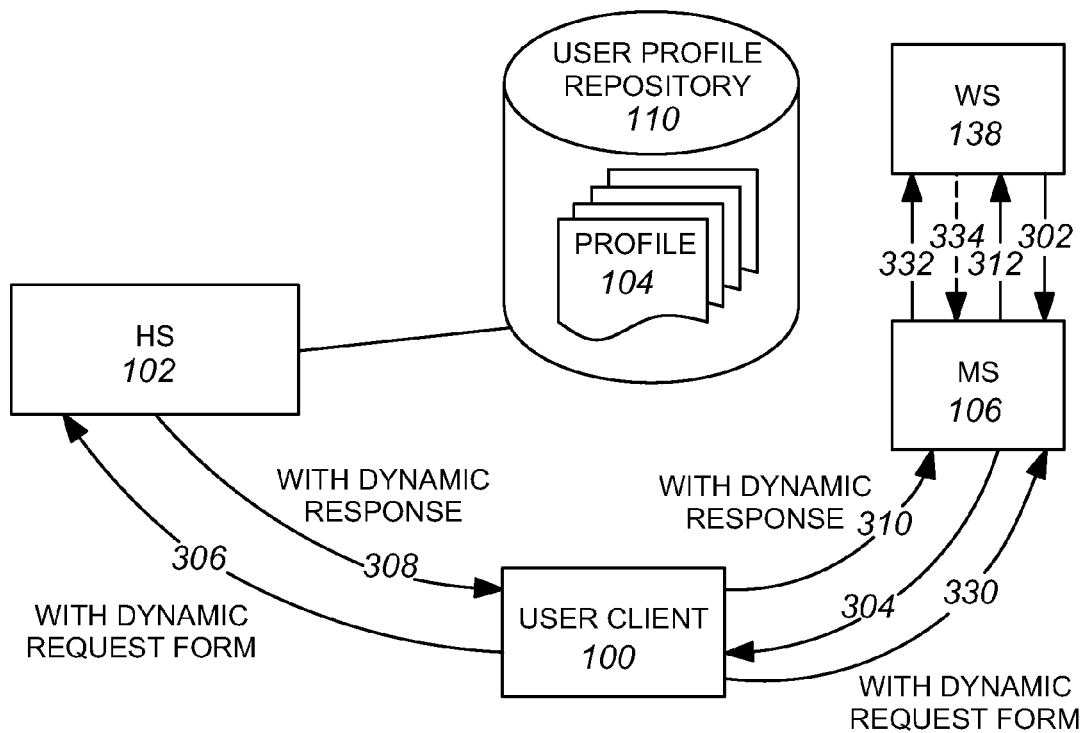
FIG. 7 illustrates an exemplary identity management network topology.

In one scenario, illustrated by FIG. 7, the User Client makes a content request of a Membersite (MS) 106 over data path 330, which in turn makes a call on a Web Service (WS) 138, over data path 332. This, in turn causes a request for a piece of identity data that is stored at a Homesite (HS) 102. WS 138 sends the data request to MS 106 over data path 302. After receiving the data request from WS 138, MS 106 sends a dynamic request over data paths 304 and 306 to HS 102. The dynamic request contains a form stating that WS 138 has requested the data and listing a set of actions that the user can select from regarding the use of the data. After receiving input to the form from User Client 100, HS 102 sends a response including responses to the Dynamic Request over data paths 308 and 310 to MS 106. MS 106 processes the response and issues the requested data to WS 138 over data path 312 along with the restrictions specified by the user regarding what WS 138 can do with the requested data and the length of time that they can use the data. Additionally, if a Membersite needs to request additional data that is not to be stored at the user's Homesite, it can request the data as part of a Dynamic Request. Note that it is also possible for other sites, such as sites that act as Authoritative Sites, to send Dynamic Requests to a user's Homesite.

In another scenario, the User Client 100 makes a content request of a Membersite (MS) 106 over data path 330, which in turn makes a call on a WS 138, over data path 332. This, in turn causes a request for a piece of identity data that is stored at a Homesite (HS) 102. WS 138 sends the data request to MS 106 over data path 302. After receiving the data request from WS 138, MS 106 sends a request over data paths 304 and 306 to HS 102. HS 102 sends a response over data paths 308 and 310 to MS 106. MS 106 processes the response and reissues the original call on WS 138 over data path 312 this time providing the requested data. WS 138 returns the response of the call to MS 106 over data path 334. The response may include a token for MS 106 to use in subsequent calls to WS 138 indicating that the requested data has been previously retrieved by MS 106.

A membersite may make requests of multiple web services, rather than the single web service shown in FIG. 7. These requests may form a chain of requests (multiple sequential requests from the membersite), may take on a recursive form (web service calls web service calls web service for example), or may take on a parallel form (multiple essentially simultaneous requests from the membersite). Moreover, blends of these approaches may occur depending on how data is distributed on the web.

Figure 8:
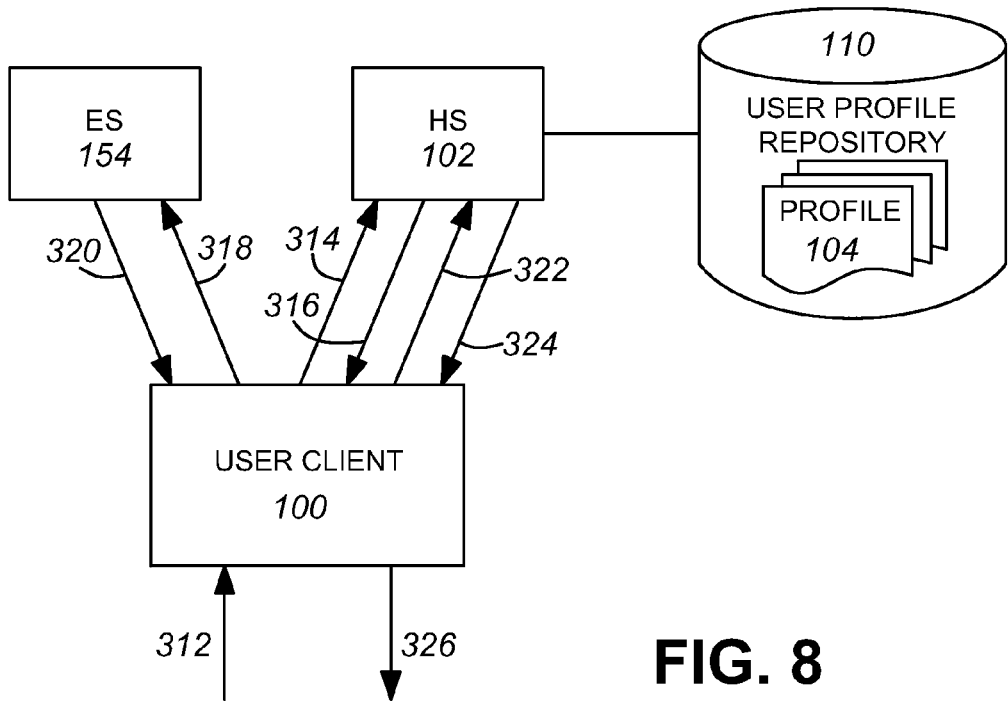
FIG. 8 illustrates an exemplary system and data flow for obtaining data from an external server.

A homesite may not always be able to fulfill a request for claims, whether anonymously or with identification information. A Dynamic Request can also be used to request data or perform a transaction that involves additional data stored at another site. FIG. 8 provides an illustration of this scenario. User client 100 receives a request from a membersite over datapath 312, and forwards the request for identity information to HS 102 over datapath 314. The request includes a dynamic request with a request for additional data stored at, or a transaction that needs to be performed at, another site. After processing the dynamic request, HS 102 issues a request to an external site (ES) 154 through user client 100 over datapaths 316 and 318.

ES 154 can then process the request, generate the required identity data, and send the data to HS 102 over data paths 320 and 322 via User Client 100. HS 102 can then incorporate the data generated by ES 154 into its response. The response can then be sent to the user client over datapath 324, which is then forwarded to the membersite over datapath 326. Alternatively, the data paths may be established without using the homesite 102 as an intermediary. Note that incorporating the identity data into the response need not mean that it is bodily incorporated—it may suffice to include a dependent identity claim in the response, with the dependent claim depending on an identity claim received from ES 154 for validity.

As a non-limiting example of how such a system may be used, consider the situation where a membersite requires proof from the user that a payment has been made. The membersite can issue an identity data request for an identity claim signed by a financial institution indicating that a payment has been made. The membersite can issue the request for proof of payment in the dynamic request form sent to the HS over data paths 312 and 314. HS 102 can then redirect the user client 100 to ES 154 (the financial site) with a request to obtain proof of payment over datapaths 316 and 318. If the user has not made the payment, ES 154 can require the payment be made. Upon completion of the payment, or if the user has already made the payment, ES 154 can issue an identity claim over data path 320 and 322 asserting that the payment has been made. HS 102 can either issue its own identity claim, dependent upon the claim provided by ES 154, or can forward the identity claim issued by ES 154, to the membersite over datapaths 324 and 326. The identity claim provided by ES 154 can optionally be stored in profile 104 in user profile repository 110. The user can be prompted by HS 102 to store the identity claim for future use. The MS can specify in the initial request whether it wants HS 102 to issue an identity claim or whether it wants the identity claim from ES 154. Receiving a claim from ES 154 typically requires an existing trust relationship between ES 154 and the membersite.

In an alternate scenario, the Membersite could send a claim containing an invoice as part of a Dynamic Request. In this case, the Membersite can contact the Financial Site out of band to initiate the transfer of funds. The data flow for both scenarios is similar to that shown in FIG. 8. In an alternate scenario, the financial transaction could be processed by an application at the Homesite instead of at an external site.

Various processes may be used in transferring identifying information within a system or network. Some of those processes have been detailed in relation to various structures and relationships. However, an alternative description of a process of operating an identity system may provide further insights.

To provide verification that data has not been tampered with during transit from the homesite to the membersite, the membersite, upon receipt of the response, can compute a digest of the response. The resulting digest or token, can be directly provided to the homesite along with the nonce so that the homesite can issue a verification of the data. This direct connection can be performed using back channel communications, preventing possible user tampering. Where the GUPI is a URL, the membersite can easily determine the homesite. Where the GUPI is not a URL, the membersite can contact the rootsite for the namespace of the GUPI and obtain both confirmation that the homesite is authoritative, and an address at which the homesite can be reached to verify identity transactions.

Although the above discussion has been based on the homesite providing user identity information to a membersite, the membersite can push user data, or identity claims, to the homesite via the user. This allows the membersite to issue identity claims to the user that can be stored at the homesite for later retrieval by the membersite. The homesite can request user authorization (after user authentication) to store identity data pushed by the membersite.

Figure 9:
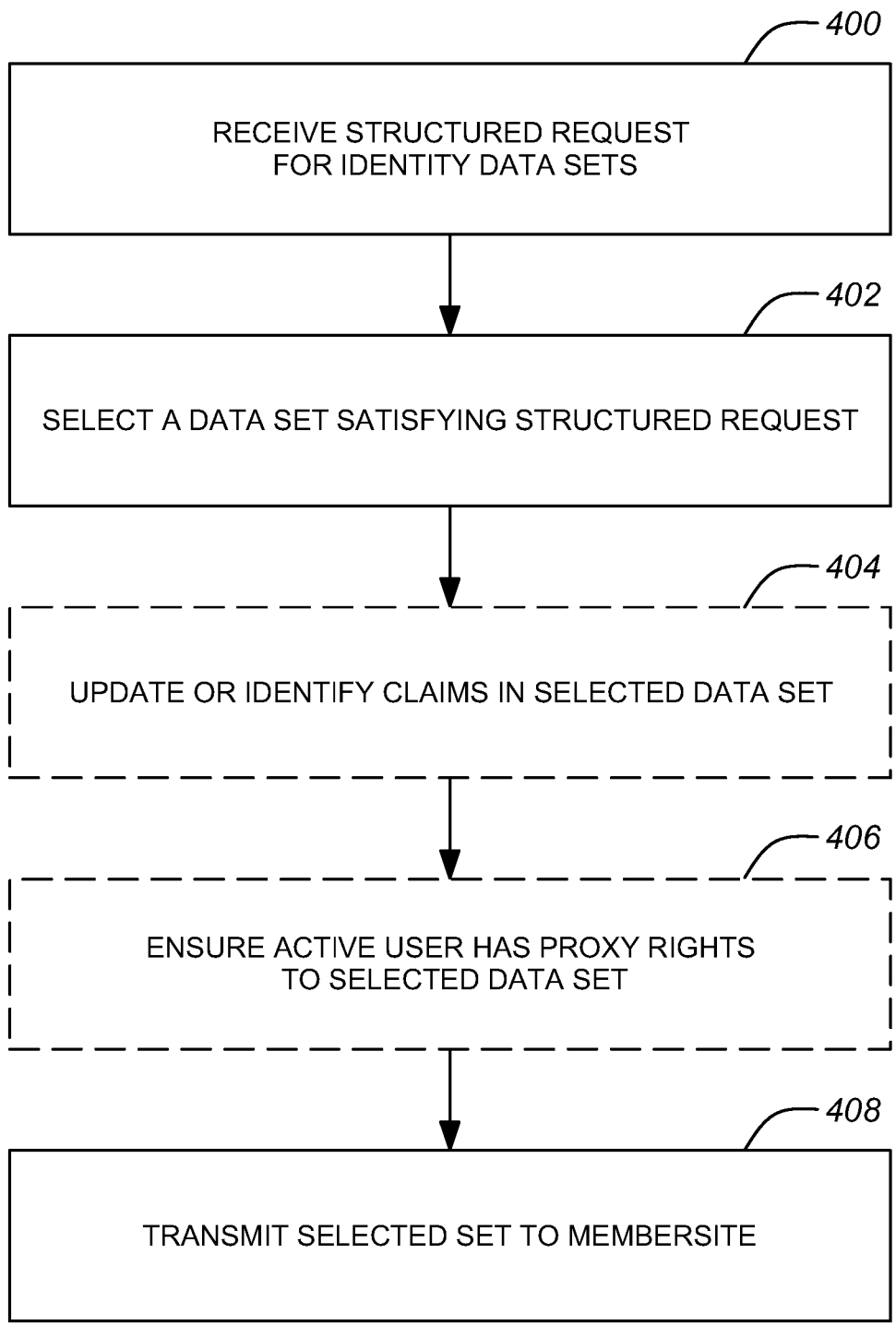
FIG. 9 is a flowchart illustrating an exemplary method of responding to a request for one of a plurality of data sets.

FIG. 9 is a flowchart illustrating a method of selecting one of a plurality of requested data sets to provide to a membersite as discussed above. One skilled in the art will appreciate that this method is being presently described from the viewpoint of the homesite, although it can equally be described from the position of the user client or the membersite without departing from the scope of the present invention. In step 400, the homesite receives a structured request for a plurality of identity data sets. In step 402, a data set satisfying the structured request is selected. This selection can be done in accordance with either a hard priority list, in conjunction with predetermined user preferences, in accordance with a soft priority list, and/or in accordance with user input. In step 408, the selected set of identity data is transmitted to the membersite. If the requested set of identity data includes identity claims, the claims are preferably validated by the homesite prior to transmission in step 408, and may require updating as described in step 404. If the active user is not the user whose data is being requested, the homesite preferably ensures that the active user has proxy rights to the selected data set in step 406.

Figure 10:
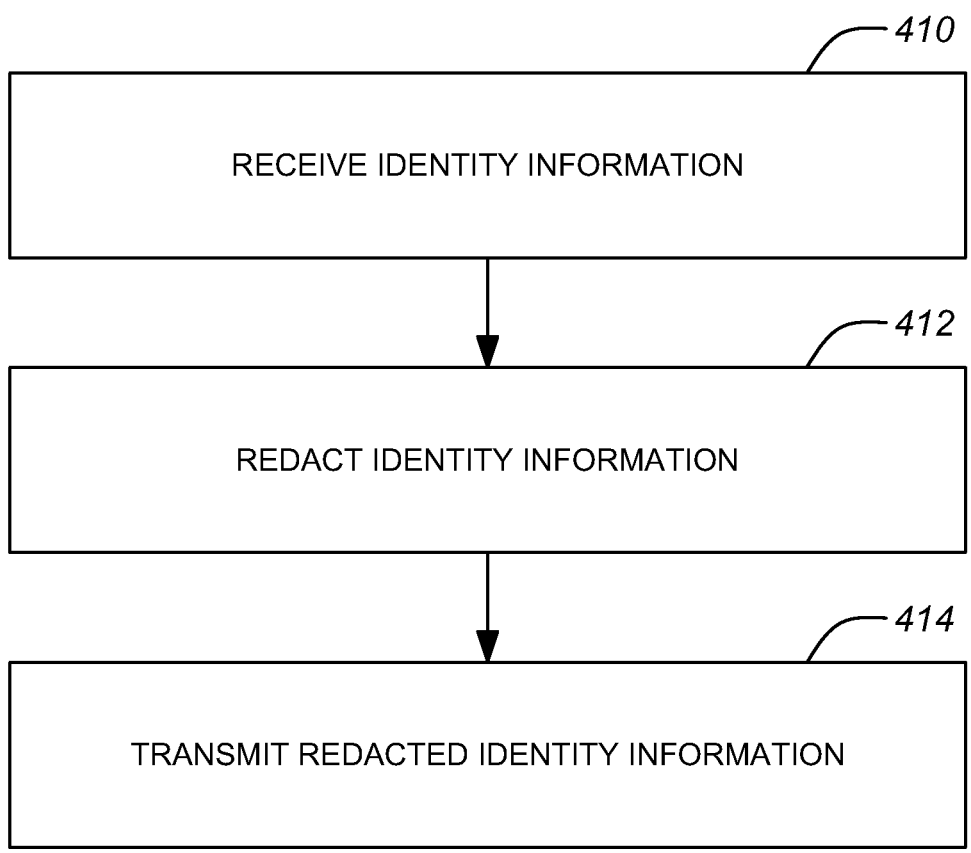
FIG. 10 is a flow chart illustrating an exemplary method for anonymizing identity information.

In FIG. 10 a method of anonymizing user data is illustrated in a flowchart. In step 410 identity data is received. The identity data received in step 410 can be accompanied by an indication of the data that should be redacted. This indication can be explicit, can be derived based on known user preferences, or based on known membersite preferences. In step 412 the identity information is redacted to anonymize the information. This may include removal of identifying information such as a GUPI, or the obfuscation of information such as an address or a date of birth. When information in obfuscated, it is modified to hide specific detail, for example, a residential address may be modified to indicate that the user resides within a particular postal or ZIP code, or it may be modified to indicate only the city, state, province or country in which the user resides. A date of birth may be redacted to provide only the year of birth, or it may be redacted to indicate only that a user is above or below a threshold age. As discussed above, the redaction process can be a combination of both removal and obfuscation, so that the result is only the nonce of the transaction bound to an indication that the user is above a threshold age. The redacted information is preferably signed by the anonymizer so that the membersite will know who performed the redaction. In step 414 the redacted identity information is transmitted to the membersite. As discussed above, it is preferable that the information is transmitted to the membersite via the user. Those skilled in the art will appreciate that the step of receiving identity information may include receiving identity information from an external homesite, or may include receiving identity information from an element in the same homesite.

Figure 11:
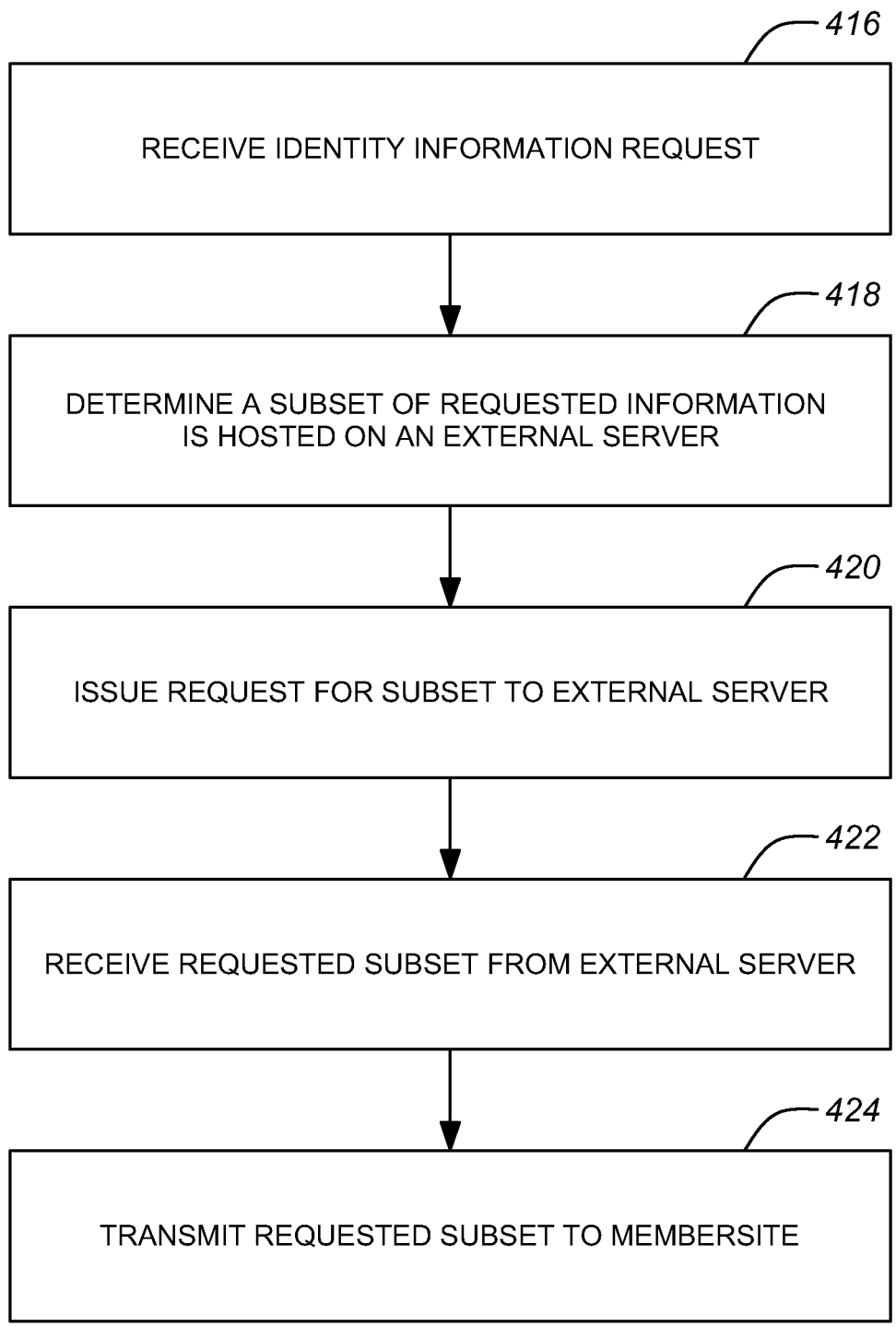
FIG. 11 is a flow chart illustrating an exemplary method for obtaining identity information from an external server.

FIG. 11 illustrates a method of obtaining user information from an external site. Once again, this is presented from the perspective of the homesite, although the method performed at the membersite, the user client, and the external site should all be considered as being within the scope of the present invention. In step 416 a request for identity information is received. In step 418 a determination is made that a subset of the requested information is hosted on an external server. This determination can be made by the homesite in accordance with instructions provided in the received request, or can be made by examining the information stored by the homesite. In step 420 a request for the subset is issued to the external server. The identity of the external server can be provided to the homesite in the received request, can be supplied by the user, or can be determined by the homesite in accordance with predetermined rules and information. In step 422 the requested subset of received from the external server, and in step 424 the requested subset is transmitted to the membersite. One skilled in the art will appreciate that the subset need not be a strict subset, allowing for the possibility that none of the data requested will be hosted by the homesite. The requested data may include a plurality of subsets, each subset hosted by a different external server. The received identity request may be a request for an identity claim that depends on an identity claim stored by the external server, in which case the subset of the identity request is for a data element that is used to verify an identity claim, but is not explicitly recited in the identity information request. One skilled in the art will further appreciate that all transactions with the membersite and the external server are preferably performed through the user to preserve a user-centric approach to the identity management.

The present invention, in some embodiments, also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy, disks, optical disks, CD-ROMS, DVDs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Various processes may be implemented as a result of an identity system and framework such as that described herein.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
receiving, by a computing system comprising one or more processors, a first request for one or more of a plurality of sets of identity data associated with a user;
transmitting a second request to release from a homesite at least one of the requested plurality of sets of identity data associated with the user that would authenticate the user at a membersite;
selecting a set of the at least one of the plurality of requested sets of identity data associated with the user to release in accordance with a user preference;
receiving, by an anonymizer and through a network interface, at least a portion of identity information in the selected set of identity data and user instructions to anonymize the identity information;
redacting the identity information to remove identifying information associated with the user; and
transmitting the selected set of identity data associated with the user to the membersite.

2. The method of claim 1 wherein receiving the first request includes receiving a request from the membersite via the user.

3. The method of claim 1 wherein selecting the set of the at least one of the plurality of sets of identity data includes selecting in accordance with a predetermined user preference.

4. The method of claim 1 wherein selecting the set of the at least one of the plurality of sets of identity data includes:
presenting the plurality of sets of identity data to the user; and
obtaining a user selection of the set of the at least one of the plurality of sets of identity data.

5. The method of claim 1 wherein the said transmitting includes transmitting the selected set one of the plurality of sets of identity data to the membersite via the user.

6. The method of claim 1 wherein the received first request includes an ordered list of the plurality of sets of identity data, wherein said selecting includes providing the plurality of sets of identity data for selection according to the ordered list.

7. The method of claim 6 wherein the ordered list includes an indication of a hard priority from the membersite, the hard priority identifying identity data required by the membersite.

8. The method of claim 6 wherein the ordered list includes an indication of a soft priority from the membersite, the soft priority identifying a preference for some identity data over other identity data by the membersite.

9. The method of claim 8 wherein the indication of the soft priority includes an indication of an association between each of the plurality of sets of identity data and a plurality of levels of access.

10. The method of claim 1 wherein the plurality of sets of identity data includes an identity claim.

11. The method of claim 10 wherein the identity claim includes an expiry date.

12. The method of claim 11 wherein said transmitting the selected of identity data includes determining if the identity claim has expired.

13. The method of claim 11 wherein transmitting includes:
updating an expired identity claim included in the selected set of identity data; and
transmitting the selected set of identity data upon receipt of an updated identity claim for the expired identity claim.

14. The method of claim 10 wherein the identity claim includes attributes of the user.

15. The method of claim 10 wherein the identity claim includes an attribute of the homesite.

16. The method of claim 15 wherein the attribute is a certification of an authentication at the homesite.

17. The method of claim 16 wherein the authentication is provided by a third party.

18. The method of claim 16 wherein the certification includes a hash of an authentication engine at the homesite used to authenticate an identity of the user.

19. The method of claim 1 further comprising:
receiving proxy rights to access user identity information associated with the user, the proxy rights including an identity claim needed to access the user identity information;
determining that another user that generated the first request has received proxy rights to the requested user identity information, the determination based at least in part on a confirmation that the another user has an identity claim providing authorization for the requested user identity information, wherein the another user is not associated with the requested user identity information and is requesting access to the requested user identity information on behalf of the user; and transmitting through the network interface the requested user identity information to the membersite upon determination that the another user has received the proxy rights.

20. The method of claim 19 wherein said determining includes determining that the another user is listed on a proxy list associated with the user associated with the requested user identity information.

21. The method of claim 19 wherein determining includes authenticating the another user.

22. The method of claim 19 wherein the request for user identity information is received as a uniform resource locator.

23. The method of claim 22 wherein the uniform resource locator points to a static request document.

24. The method of claim 22 wherein the uniform resource locator points to a dynamic request document generated in accordance with at least one of a user network address and a requested service.

25. The method of claim 1,
wherein the anonymizer signs the redacted identity information; and
wherein transmitting the selected set of identity data comprises transmitting, by the anonymizer and through the network interface, the redacted identity information to the membersite.

26. The method of claim 1 wherein the identity information includes information selected from a list including: a unique identifier associated with the user; a user birth date; and a user address.

27. The method of claim 1 wherein the identifying information comprises a unique identifier and said redacting includes replacing the unique identifier with an identifier that is pairwise unique between the user and the membersite.

28. The method of claim 1 wherein the identifying information comprises a unique identifier and said redacting includes replacing the unique identifier with an identifier selected from a pool of identifiers.

29. The method of claim 1 wherein the identifying information comprises a user birth date and said redacting includes replacing the user birth date with an age range.

30. The method of claim 1 wherein the identifying information comprises a user address and said redacting includes replacing the user address with one of a country, province, state, city, postal code, zip code or other non-specific geographical indicator derived in accordance with the user address.

31. The method of claim 1, wherein receiving the request comprises receiving the request by a homesite comprising one or more computing systems, the method further comprising:
determining, by the homesite, that an element in the requested one or more of sets of user identity data is hosted by an external site;
issuing, by the homesite, a request for the element hosted by the external site to the external site;
receiving, by the homesite, the requested element from the external site; and
transmitting, by the homesite, the requested element from the external site to the membersite in response to the received request.

32. The method of claim 31 wherein said receiving the request includes receiving the request from the membersite via the user.

33. The method of claim 31 wherein said issuing the request for the element includes redirecting the user to the external site with the request for the element.

34. The method of claim 31 wherein said receiving the requested element includes receiving the requested element from the external site via the user.

35. The method of claim 31 wherein said transmitting the requested element includes transmitting the requested element via the user.

36. A system comprising:
a processor configured to receive a first request for one or more of a plurality of sets of identity data associated with a user;
a transmitter configured to transmit a second request to release from a homesite at least one of the requested plurality of sets of identity data associated with the user that would authenticate the user at a membersite;
the processor further configured to select a set of the at least one of the plurality of requested sets of identity data associated with the user to release in accordance with a user preference;
the processor in data communication with an anonymizer, the anonymizer configured to:
receive at least a portion of identity information in the selected set of identity data;
receive a user instruction to redact the identity information; and
remove identifying information associated with the user based on the received user instruction; and
the transmitter configured to transmit the selected set of identity data associated with the user to the membersite.

37. A non-transitory computer readable storage medium including instructions executable by a processor of a device, the instructions causing the device to:
receive a first request for one or more of a plurality of sets of identity data associated with a user;
transmit a second request to release from a homesite at least one of the requested plurality of sets of identity data associated with the user that would authenticate the user at a membersite;
select a set of the at least one of the plurality of requested sets of identity data associated with the user to release in accordance with a user preference;
receive at least a portion of identity information in the selected set of identity data and user instructions to anonymize the identity information;
redact the identity information to remove identifying information associated with the user; and
transmit the selected set of identity data associated with the user to the membersite.

* * * * *